US006329459B1

(12) United States Patent
Kang et al.

(10) Patent No.: US 6,329,459 B1
(45) Date of Patent: Dec. 11, 2001

(54) EXTENDED SYNDIOTACTIC POLYSTYRENE-ELASTOMERIC BLOCK COPOLYMERS

(75) Inventors: Jung W. Kang, Honolulu, HI (US); Xiaorong Wang; Xiao-Liang Luo, both of Akron, OH (US); Frank J. Clark, Massillon, OH (US); Jason T. Poulton, Newark, OH (US); Takahiro Matsuse; Naruhiko Mashita, both of Kodaira (JP); Hideo Takeichi, Akron, OH (US); Shinichi Toyosawa, Tokorozawa (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/710,829

(22) Filed: Sep. 23, 1996

(51) Int. Cl.[7] .............................. C08J 3/00; C08K 3/40; C08L 53/00; C08L 9/00
(52) U.S. Cl. .......................... 524/505; 524/494; 525/88; 525/89; 525/98; 525/314
(58) Field of Search ............................ 525/314, 98, 89, 525/88; 524/505, 494

(56) References Cited

U.S. PATENT DOCUMENTS

| | | |
|---|---|---|
| 3,346,528 | 10/1967 | Slocombe et al. . |
| 3,639,520 | 2/1972 | Onishi et al. . |
| 3,953,542 | 4/1976 | Halasa et al. . |
| 3,953,543 | 4/1976 | Futamura et al. . |
| 3,959,412 | 5/1976 | Oberlin . |
| 4,117,041 | 9/1978 | Guschl . |
| 4,503,204 | 3/1985 | Bingham et al. . |
| 4,520,138 | 5/1985 | Himes . |
| 4,622,352 | 11/1986 | Dijiauw et al. . |
| 4,680,353 | 7/1987 | Ishihara et al. . |
| 4,790,365 | 12/1988 | Sandstrom et al. . |
| 4,794,132 | 12/1988 | Dijiauw et al. . |
| 4,853,154 | 8/1989 | Icenogle et al. . |
| 4,853,436 | 8/1989 | Ohata et al. . |
| 4,882,378 | 11/1989 | Himes . |
| 4,904,725 | 2/1990 | Himes . |
| 5,034,441 | 7/1991 | Nakano et al. . |
| 5,066,741 | 11/1991 | Campbell, Jr. . |
| 5,071,953 | 12/1991 | Nakano et al. . |
| 5,082,717 | 1/1992 | Yaguchi et al. . |
| 5,093,422 | 3/1992 | Himes . |
| 5,109,068 | 4/1992 | Yamasaki et al. . |
| 5,145,950 | 9/1992 | Funaki et al. . |
| 5,155,080 | 10/1992 | Elder et al. . |
| 5,162,278 | 11/1992 | Razavi . |
| 5,164,479 | 11/1992 | Funaki et al. . |
| 5,169,706 | 12/1992 | Collier, IV et al. . |
| 5,169,893 | 12/1992 | Beck . |
| 5,171,834 | 12/1992 | Funaki . |
| 5,183,871 | 2/1993 | Yamasaki et al. . |
| 5,200,454 | 4/1993 | Nakano . |
| 5,206,197 | 4/1993 | Campbell, Jr. . |
| 5,223,467 | 6/1993 | Razavi . |
| 5,223,468 | 6/1993 | Razavi . |
| 5,225,500 | 7/1993 | Elder et al. . |
| 5,243,002 | 9/1993 | Razavi . |
| 5,247,020 | 9/1993 | Nakano et al. . |
| 5,250,629 | 10/1993 | Tani et al. . |
| 5,260,126 | 11/1993 | Collier, IV et al. . |
| 5,260,394 | 11/1993 | Tazaki et al. . |
| 5,273,830 | 12/1993 | Yaguchi et al. . |
| 5,278,265 | 1/1994 | Razavi . |
| 5,283,117 | 2/1994 | Arai et al. . |
| 5,283,294 | 2/1994 | Hsu et al. . |
| 5,288,791 | 2/1994 | Collier, IV et al. . |
| 5,292,838 | 3/1994 | Razavi . |
| 5,294,685 | 3/1994 | Watanabe et al. . |
| 5,304,523 | 4/1994 | Razavi . |
| 5,304,599 | 4/1994 | Himes . |
| 5,322,869 | 6/1994 | Yamasaki et al. . |
| 5,340,892 | 8/1994 | Kuramoto . |
| 5,352,727 | * 10/1994 | Okada ................................. 524/495 |
| 5,352,744 | * 10/1994 | Bates et al. .......................... 525/339 |
| 5,356,944 | 10/1994 | Blythe et al. . |
| 5,362,814 | 11/1994 | Machida et al. . |
| 5,373,031 | 12/1994 | Funaki et al. . |
| 5,391,603 | 2/1995 | Wessel et al. . |
| 5,391,611 | 2/1995 | Funayama et al. . |
| 5,391,629 | 2/1995 | Turner et al. . |
| 5,395,890 | 3/1995 | Nakano et al. . |
| 5,412,024 | 5/1995 | Okada et al. . |
| 5,418,276 | 5/1995 | Machida et al. . |

(List continued on next page.)

FOREIGN PATENT DOCUMENTS

| | | |
|---|---|---|
| 702610 | 1/1965 | (CA) . |
| 0 440 922 A1 | 8/1991 | (EP) . |
| 0 280 357 B1 | 4/1993 | (EP) . |

OTHER PUBLICATIONS

Crystallization Kinetics of Isotactic Polystyrene from Iso-tactic–Atactic Polystyrene Blends G.S.Y. Yeh and S.L. Lambert; Journal Polym. Sci. A–2(10), 1183–1191(1972).

Block Copolymers of Isotactic Polypropylene and 1,4-Polybutadiene M.A. Drzewinski and R.E. Cohen; J. Polym. Sci. Part A: Polym. Chem. 24, 2457 (1986), References therein.

Polyethylene diblock copolymers: direct syntheses and morphological analysis M.A. Drzewinski: Polymer, 35, 5024 (1994).

*Primary Examiner*—Patrick D. Niland
(74) *Attorney, Agent, or Firm*—David G. Burleson; Jude A. Fry

(57) ABSTRACT

There are disclosed a block copolymer of at least one elastomeric block and at least one syndiotactic polystyrene block which comprises 100 parts by weight of a polymer component comprising 1 to 80% by weight of syndiotactic polystyrene (sPS) block(s) and 99 to 20% by weight of rubbery elastomeric block(s) and at least 30 parts by weight of an extender. These extended block copolymer compositions display the characteristics of thermoplastic elastomers and are useful for high temperature applications possessing unique softness.

23 Claims, No Drawings

U.S. PATENT DOCUMENTS

| | | |
|---|---|---|
| 5,418,279 | 5/1995 | Ren et al. . |
| 5,418,290 | 5/1995 | Machida et al. . |
| 5,428,120 | 6/1995 | Newman et al. . |
| 5,436,397 | 7/1995 | Okada . |
| 5,451,454 | 9/1995 | Fukahori et al. . |
| 5,453,474 | 9/1995 | Newman et al. . |
| 5,459,117 | 10/1995 | Ewen . |
| 5,494,874 | 2/1996 | Rosen et al. . |
| 5,510,434 | 4/1996 | Takeuchi . |
| 5,512,643 | 4/1996 | Newman et al. . |
| 5,525,667 | 6/1996 | Forbes et al. . |
| 5,543,462 | 8/1996 | Okada et al. . |

\* cited by examiner

EXTENDED SYNDIOTACTIC POLYSTYRENE-ELASTOMERIC BLOCK COPOLYMERS

BACKGROUND OF THE INVENTION

1. Field of the Invention

The present invention relates to a novel block copolymers having blocks formed from syndiotactic polystyrene and rubbery elastomeric (co)polymers such as styrene/butadiene or polybutadiene. More particularly, it pertains to the use of an extender such as oil or other low molecular weight components to highly extend syndiotactic polystyrene block-elastomeric block copolymers to produce soft compositions having high temperature resistance and processable mechanical properties.

2. Description of Prior Art

It has been known in the past to extend thermoplastic elastomers with petroleum base oils such as naphthenic, aromatic and paraffinic oils and other low weight molecular organic matarerials in order to reduce costs and to improve the elastomeric properties of certain of the thermoplastic elastomers. In U.S. Pat. No. 5,451,454, owned by the current assignee, a blend of a high-molecular weight block copolymer having a hard block and a soft block and a large volume of oily or low molecular weight material provides a composition having unique softness, adequate mechanical strength and damping properties useful in many industrial applications. The heat resistance of this composition was not adequate for higher temperature applications including many uses in automobiles and electrical appliances.

Japanese Patent Laid Open 93-320280 discloses block copolymers having an anionically polymerized polybutadiene or poly(butadiene/styrene) block and a syndiotactic polystyrene (sPS) block. However, neither this patent or any other prior art patent suggests the use of such a composition with a high oil content to obtain a soft material having a low Shore A hardness It is extremely desirable to prepare a block copolymer composition having elastomeric characteristics, good mechanical strength, unique softness and utility in high temperature applications.

SUMMARY OF THE INVENTION

The object of the present invention is to provide a composition containing a polystyrene-elastomeric block copolymer having elastomeric characteristics such as improved heat resistance, softness, elasticity and mechanical strength, also being well suited to be molded into industrial materials such as electric and electronic materials, industrial construction materials, car parts, domestic electrical appliances and various mechanical parts.

A composition containing an extended block copolymer having blocks formed from (1) a syndiotactic polystyrene and (2) an elastomeric composition such as polybutadiene or styrene/butadiene is produced according to the present invention. This composition is greatly improved in heat resistance, mechanical strength without detriment to the softness and elasticity of the composition. The extended block copolymers of the present invention contain: (1) at least one elastomeric block and (2) at least one syndiotactic polystyrene block which comprises 100 parts by weight of a block copolymer comprising 1 to 80% by weight of syndiotactic poly(vinyl aromatic hydrocarbon) block(s), preferably syndiotactic polystyrene (sPS) block(s), and 99 to 20% by weight of rubbery elastomeric block(s) and at least 30 parts by weight, preferably 30 to about 1000 parts by weight, of an extender such as an oil extender or other low molecular weight component.

DESCRIPTION OF PREFERRED EMBODIMENT

The extended block copolymer compositions of the present invention contain: 100 parts by weight of a block copolymer having 1 to 80% by weight of syndiotactic poly(vinyl aromatic hydrocarbon) block(s), preferably syndiotactic polystyrene (sPS) block(s), and 99 to 20% by weight of rubbery elastomeric block(s) and at least 30 parts by weight, preferably 30 to about 1000 parts by weight, of an extender such as low molecular weight component or an oil extender. In a preferred embodiment the compositions of the present invention are oil-extended block copolymers comprising 10 to 50% by weight of syndiotactic poly(vinyl aromatic hydrocarbon) block(s), preferably syndiotactic polystyrene (sPS) block(s), and 90 to 50% by weight of rubbery elastomeric block(s). If the weight percent of sPS blocks is greater than 80% then the elasticity of the final composition is adversely effected and the miscibility of the block copolymer with the oil or low molecular weight extender is not acceptable. If the weight percent of sPS blocks is less than 1% substantial improvement in heat resistance and mechanical properties are not obtained.

The elastomeric block segments of the block copolymers prepared in accordance with the present invention can be any elastomeric block segment including but not limited to polybutadiene, polyisoprene, styrene/butadiene random copolymer (SBR) preferably having a butadiene/styrene weight ratio of about 85/15 to about 45/55, a styrene/butadiene/styrene block copolymer (SBS), styrene/isoprene block/styrene block copolymer (SIS) and partially or fully hydrogenated versions of these polymers and copolymers. Preferable elastomeric block segments include polybutadiene, random styrene/butadiene copolymers (random SBR), tapered SBR, microblock SBR, random styrene/isoprene copolymer (random SIR), tapered SIR, random styrene/butadiene/isoprene (random SIBR), styrene-ethylene/butylene-styrene block copolymer (SEBS), styrene-ethylene/butylene block copolymer (SEB), styrene-ethylene/propylene-block copolymer (SEP), styrene-ethylene/propylene-styrene block copolymer (SEPS), styrene-ethylene/propylene-ethylene block copolymer (SEPE), styrene-ethylene/butylene-ethylene block copolymer (SEBE), styrene-ethylene/styrene block copolymer (SES), ethylene-ethylene/butylene block copolymer (EEB), ethylene-ethylene/butylene/styrene block copolymer (hydrogenated BR-SBR block copolymer), ethylene-ethylene/butylene/styrene-ethylene block copolymer (hydrogenated BR-SBR-BR block copolymer), ethylene-ethylene/butylene-ethylene block copolymer (EEBE) and the like.

Preferably the elastomeric block segments containing butadiene contributed units in the block copolymers of the present invention contain low vinyl content, or elastomeric block segments containing isoprene contributed units in the block copolymers contain low 3,4-isoprene content, less than a 20% vinyl or 3,4-isoprene content, preferably less than a 10% vinyl or 3,4-isoprene content in the respective butadiene or isoprene contributed units. Such block copolymers compositions with a suitable extender possess superior processability, superior heat resistance and weatherability.

The most preferable elastomer block segments are SBR blocks made by semi-batch techniques and microblock SBR. SBR blocks made by semi-batch techniques are made by a controlled feeding technique, called metering, using little or no modifier to produce a block having a low vinyl content in butadiene contributed units and randomized styrene distribution. Microblock SBR is produced, normally in a batch process, with a potassium-type randomizer such as potassium t-amylate or potassium dodecyl benzene sulfonate as described in U.S. Pat. No. 5,153,159. This system produces low vinyl content in the diene contributed units and a microblock styrene sequence having a peak in the S3 to S8 linear block segments.

Polymerizable 1,3-diene monomers that can be employed in the production of the elastomeric block segment of the block copolymers of the present invention are one or more 1,3-conjugated dienes containing from four to twelve, inclusive, carbon atoms per molecule. Exemplary monomers include 1,3-butadiene, isoprene; 2,3-dimethyl- 1,3-butadiene; 1,3-pentadiene (piperylene); 2-methyl-3-ethyl-1, 3-butadiene; 3-methyl-1,3-pentadiene; 1,3-hexadiene; 2-methyl-1,3-hexadiene; 3-butyl-1,3-octadiene; and the like. Among the dialkyl-1,3-butadienes, it is preferred that the alkyl groups contain from one to three carbon atoms. The preferred 1,3-diene monomer for use in the process of the present invention is 1,3-butadiene.

Exemplary vinyl substituted aromatic hydrocarbon monomers, commonly referred to as vinyl aromatic hydrocarbon monomers or VAM, for use in the production of the elastomeric block segment of the block copolymers or in the syndiotactic poly(vinyl aromatic hydrocarbon) block(s) of the present invention include: styrene, alpha-methylstyrene; 1-vinylnaphthalene; 2-vinyl-naphthalene; 1-alpha-methylvinylnaphthalene; 2-alphamethyl-vinylnaphthalene; and mixtures of these as well as halo, alky, cycloalkyl, alkoxy, aryl, alkaryl and aralkyl derivatives thereof in which the total number of carbon atoms in the combined hydrocarbon is generally not greater than 12. Examples of these latter compounds include: 4-methylstyrene; vinyl toluene; 3,5-diethylstyrene; 2-ethyl-4-benzylstyrene; 4-phenylstyrene; 4-para-tolylstyrene; and 4,5-dimethyl-1-vinylnaphthalene. Occasionally, di- and tri- vinyl aromatic hydrocarbons are used in small amounts in addition with mono-vinyl aromatic hydrocarbons. The preferred vinyl aromatic hydrocarbon is styrene.

It is envisioned in the present invention to produce multiple block copolymers through sequential charging of the required monomers for block formation in the presence of the required anionic initiator. "living" polymer or syndiotactic catalyst. It is preferred in the present invention to prepare diblock copolymers having one syndiotactic polystyrene block and one elastomeric block. It is also within the scope of the present invention to couple a diblock copolymer with a suitable coupling agent as is known to those skilled in the art to prepare triblock copolymers.

The process according to the present invention is performed in the following manner. First, the elastomeric block segments of the block copolymers is prepared in a reactor or reaction zone by polymerizing suitable monomers, particularly diene monomers and/or vinyl aromatic monomers, to form one or more blocks in a suitable diluent in the presence of an anionic initiator. The resulting elastomeric block polymer is "living", because a catalytically active anion is present at the terminal end. The anion is capable of initiating polymerization of further monomers in the reaction zone.

The molecular weight of the elastomeric block portion of the block polymer to be used in the present invention is not specifically limited, but is desirably 5,000 to 1,000,000, more desirably 10,000 to 500,000 in terms of weight-average molecular weight.

After formation of the elastomeric block polymer segment, charges of vinyl aromatic hydrocarbon monomer, preferably styrene monomer, if not already present in the polymerization system, and metallocene-catalyst are simultaneously or sequentially added to the reaction zone containing the "living" elastomeric block to conduct Ziegler-Natta polymerization. The charge of metallocene-catalyst regulates polymerization of the styrene monomer into a syndiotactic polystyrene block.

The reaction mixture is then treated to deactivate the catalyst and recover the (syndiotactic polystyrene block)-(elastomeric block) block copolymer. While it is to be understood that any suitable treating method can be employed, one method for accomplishing the desired treatment comprises adding a catalyst-deactivating material. Exemplary catalyst-deactivating materials include water, alcohol, an organic acid, an inorganic acid, mixtures thereof and the like. It has been found to be advantageous to add an antioxidant to the polymer solution prior to isolation of the polymer. After the addition of the catalyst-deactivating material and the antioxidant, the polymer not already precipitated and remaining in the solution can then be precipitated by the addition of an excess of the catalyst-deactivating material or isolated by flashing the solvent. Deactivation of the catalyst and any necessary precipitation of the polymer can be accomplished in a single step. The precipitated polymer can then be recovered by filtration, decantation, or the like. In order to purify the polymer, the separated polymer can be redissolved in a solvent, such as those suitable for the polymerization, and again precipitated by the addition of an alcohol. Thereafter, the polymer is again recovered by a suitable separation means, as indicated hereinbefore, and dried. The solvent and alcohol can be separated, for example, by fractional distillation, and recycled. The antioxidant can be added to the reaction mixture prior to precipitation of the polymer, to the solution of redissolved polymer, or to the solvent in which the polymer is to be subsequently redissolved.

Polymerization can be carried out at any convenient temperature employed in the polymerization arts. Exemplary polymerization temperatures lie in the range of from less than about 0° to 200° C. or more, preferably ranging from about 40° to 100° C. for each step. The reaction temperature at the said polymerization is not critical so long as it is lower than the temperature at which the polymer is fused, and generally it is set to a temperature of 150° C. or lower.

The polymerization times can vary widely as may be convenient, and will, of course, be affected by polymerization temperatures chosen. The times should be chosen, for each step, such that substantially complete polymerization is obtained.

Any anionic initiator that is known in the art as useful in the copolymerization of diene monomers with vinyl aromatic hydrocarbons can be employed in the process of the instant invention. Exemplary organo-lithium catalysts include lithium compounds having the formula $R(Li)_x$, wherein R represents a hydrocarbyl radical of 1 to 20, preferably 2 to 8, carbon atoms per R group and x is an integer from 1 to 4. Typical R groups include aliphatic radicals and cycloaliphatic radicals, such as alkyl, cycloalkyl, cycloalkylalkyl, alkylcycloalkyl, aryl and alkylaryl radicals. Specific examples of R groups for substitution in the above formulas include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methylcyclopentylethyl, cyclopentyl, dimethylcyclopentyl, ethylcyclopentyl, methylcyclohexyl, dimethylcyclohexyl, ethylcyclohexyl, isopropylcyclohexyl, and the like.

Specific example of other suitable lithium catalysts include: p-tolyllithium, 4-phenylbutyl-lithium, 4-butylcyclohexyllithium, 4-cyclohexylbutyl-lithium, lithium dialkyl amines, lithium dialkyl phosphines, lithium alkyl aryl phosphine, lithium diaryl phosphines, 1,3,3-trilithio-1-octyne, 1,1,3-trilithio-1,2-butadiene and the like. The preferred catalyst for use in the present invention are n-butyllithium and sec-butyllithium.

In general, the charge of anionic initiator used to initiate polymerization of the elastomeric block will be in the range of from 0.1 to 5 milliequivalents of initiator per 100 parts by weight of total amount of monomer charged into the reaction zone and will preferably be in the range of from 0.4 to 2 milliequivalents of initiator per 100 parts by weight of total monomer charged.

Before switching the catalyst system from Li type to Ti type for syndiotactic polymerization of styrene-type monomers, it has been found that a styrenyl lithium chain end is somewhat difficult to be smoothly converted to a styrenyl-Ti active species. It is therefore useful to convert styrenyl lithium chain ends to butadienyl-Li by adding a small amount of butadiene monomer before charging the Ti catalyst. This conversion technique is especially applicable when the elastomeric block has a high styrene content (>30%) or when a chain end structure's ratio of styrenyl-Li/butadienyl-Li is higher than 30/70.

Upon completion of the polymerization of the elastomeric block, styrene monomers and a catalyst to promote syndiotactic configuration of the polymerizing styrene monomers are added into the polymerization reactor. The polymerizing styrene block in syndiotactic configuration attaches onto the "live" ends of the elastomeric block.

A styrenic polymer block having syndiotactic configuration has a stereochemical structure of syndiotactic configuration, i.e. the stereostructure in which phenyl groups of substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic block having such syndiotactic configuration as mentioned in the present invention can be polystyrene, poly(alkylstyrene), poly(halogenated styrene), poly(halogenated alkylstyrene), poly(alkoxystyrene), poly(vinyl benzoate), hydrogenated polymers thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly(fluorostyrene). Poly(halogenated alkylstyrene) includes poly(chloromethylstyrene). Poly(alkoxystyrene) includes poly(methoxystyrene), and poly(ethoxystyrene).

The particularly desirable styrenic blocks are polystyrene, poly(p-methylstyrene), poly(m-metylstyrene), poly(p-tert-butylstyrene), poly(p-chlorostyrene), poly(m-chlorostyrene), poly(p-fluorostyrene), hydrogenated polystyrene and the copolymer containing the structural units thereof. Preferred styrene monomers for use in the preparation of the syndiotactic polystyrene block include styrene, alpha-methylstyrene, p-methylstyrene, and mixtures thereof. Hydrogenation techniques used in hydrogenating the polymers or blocks thereof in the the present invention are standard hydrogenation processes known to those skilled in the art The molecular weight of the styrenic block portion of the block polymer to be used in the present invention is not specifically limited, but is desirably 1,000 to 1,000,000, more desirably 5,000 to 500,000 in terms of weight-average molecular weight. The molecular-weight distribution, that is, the broadening of molecular weight of the styrenic polymer is not specifically limited as well, but may be in a wide range. A weight-average molecular weight of less than 1,000 is unfavorable since the composition or molding obtained is deteriorated thereby in the thermal and mechanical properties.

The melting point temperature of the styrenic block portion of the block polymer in the present invention is necessarily at least 150° C., most preferably greater than 200° C. to permit the block polymer to have high temperature applications.

The styrenic block having such syndiotactic configuration can be produced by polymerizing a styrenic monomer which corresponds to the above styrenic polymer in the presence of solvent used in the initiation of the first elastomeric block by the use of a catalyst comprising a titanium compound and a condensation product of water and trialkylaluminum (Japanese Patent Application Laid-Open No. 187708/1987). In addition, the poly(halogenated alkylstyrene) and the hydrogenated product thereof can be produced by the processes described in Japanese Patent Application Laid-Open Nos. 46912/1989 and 178505/1989, respectively.

The styrene-based blocks having a high syndiotactic configuration of the present invention can be obtained, for example, by polymerizing a styrene-based monomer (corresponding to the desired styrene-based polymer block, including styrene and styrene derivatives) with a catalyst comprising a titanium compound and the reaction product of a condensing agent and an organoaluminum compound in the presence or absence of a inert hydrocarbon solvent.

Various titanium compounds can be used as the catalyst therein. A preferred example is at least one compound selected from the group consisting of titanium compounds and titanium chelate compounds represented by the general formula:

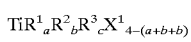

$$TiR^1_a R^2_b R^3_c X^1_{4-(a+b+b)}$$

or

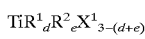

$$TiR^1_d R^2_e X^1_{3-(d+e)}$$

wherein $R^1$, $R^2$ and $R^3$ are each a hydrogen atom, an alkyl group having 1 to 20 carbon atoms, an alkoxyl group having 1 to 20 carbon atoms, an aryl group having 6 to 20 carbon atoms, an alkylaryl group having 6 to 20 carbon atoms, an ayrlalkyl group having 6 to 20 carbon atoms, an acyloxyl group having 1 to 20 carbon atoms, a cyclopentadienyl group, a substituted cyclopentadienyl group or an indenyl group, $X^1$ is a halogen atom, a, b and c are each an integer of 0 to 4, and d and e are each an integer of 0 to 3.

In addition, the condensed titanium compounds represented by the general formula:

(wherein $R^4$ and $R^5$ are each a halogen atom, an alkoxyl group having 1 to 20 carbon atoms, or an acyloxyl group having 1 to 20 carbon atoms and k is a number of 2 to 20) can be used as the titanium compound. These titanium compounds can be used as complexes with esters, ethers and the like.

The reaction product which is the main component, as well as the above-mentioned titanium compounds, of the catalyst of the present invention, is prepared by contacting an organoaluminum compound and a condensing agent.

As the above organoaluminum compound, various compounds can be applied. Usually trialkylaluminum compounds represented by the general formula:

$$AlR^6_3$$

(wherein $R^6$ is an alkyl group having 1 to 8 carbon atoms) are used.

A typical example of the condensing agent for said organoaluminum is water. In addition, any compounds capable of undergoing a condensation reaction with organoaluminum compounds including alkylaluminum can be used. A typical example of the reaction product is a reaction product of trialkylaluminum and water, which includes a chain alkylaluminoxane represented by the formula:

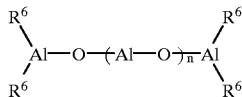

wherein n indicates polymerization degree; and cycloalkylaluminoxane having the repeating unit represented by the general formula:

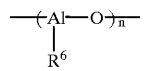

and the like.

Generally, the reaction product of organoaluminum compounds such as trialkylaluminum and water includes the abovementioned chain alkylaluminoxane and cycloalkylaluminoxane, unreacted trialkylaluminum, a mixture of various condensation products, and further complicatedly associated molecules thereof, which become various products according to the contacting conditions of trialkylaluminum and water The reaction of the organoaluminum compound and water is not specified, but can be performed according to known methods; for example, (1) a method in which an organoaluminum compound is dissolved in an organic solvent and then contacted with water; (2) a method in which an organoaluminum compound is added at the time of polymerization, and then water is added; and (3) a method in which an organoaluminum compound is reacted with water of crystallization as contained in metal salts and the like, or water absorbed on inorganic or organic compounds.

The above water may contain ammonia, amine such as ethylamine, sulfur compounds such as hydrogen sulfide, phosphorus compounds such as phosphorous ester and so on in the proportion of less than 20%.

As a catalyst, the above-described reaction product can be used singly, or in combination with said organoaluminum compound or with other organometallic compounds, or can be used in the deposited or absorbed form on an inorganic substance, etc.

The amounts of the abovementioned titanium compounds and the reaction product of organoaluminum compound and the condensing agent are optionally set depending on the types of styrenes (styrene or styrene derivatives) as the starting material and the types of catalyst components and other conditions.

The amount of catalyst to be added therein is not restricted so long as it is in a sufficient amount to complete the polymerization, but usually it is an amount that the rise in conversion at 30 minutes after the addition of catalyst is not less than 2%, preferably not less than 10%. The larger the amount of catalyst added is, the higher the reaction efficiency becomes, but said amount should be selected appropriately considering the post-treatment process and costs.

A 1,2-microstructure controlling agent or randomizing modifier can be used during formation of the polymer blocks to control the 1,2-microstructure in the diene contributed units and to randomize the amount of vinyl aromatic monomers, such as styrene, incorporated with the diene monomer, such as butadiene, in the rubbery phase. Suitable modifiers include, but are not limited to, tetramethylenediamine (TMEDA), oligomeric oxolanyl propanes (OOPS), 2,2-bis-(4-methyl-1,3-dioxane) (BMD), potassium t-amylate (KTA), potassium dodecyl benzene sulfonate (DBSK), tetrahydrofuran (THF), bistetrahydrofuryl propane and the like. Preferred modifiers include KTA and DBSK to provide low vinyl content in the butadiene contributed units or low 3,4-isoprene content in the isoprene contributed units. One or more randomizing, modifiers can be used. The amount of the modifier to the weight of the monomers in the reactor can vary from a minimum as low as 0 to a maximum as great as 400 millimoles, preferably 0.01 to 300.0 millimoles, of modifier per hundred grams of monomer currently charged into the reactor. As the modifier charge increases, the percentage of 1,2-microstructure increases in the diene monomer contributed units. A polar organic compound such as ether, polyether, tertiary amine, polyamine, thioether and hexamethylphosphortriamide can also be used to control the vinyl linkage content in the conjugated diene component. The vinyl linkage content normally changes by the amount added of the polar organic compound, and by the polymerization temperature.

The process of this invention is preferably carried out in the presence of a hydrocarbon diluent. Aliphatic, aromatic hydrocarbons, paraffins, and cycloparaffins may be employed. The preferred hydrocarbons are those containing from 3 to 12, inclusive, carbon atoms, particularly n-hexane. Examples of diluents include propane isobutene, n-pentane, isooctane, n-dodecane, cyclopentane, cyclohexane, methylcyclohexane, benzene, toluene, xylene, and the like. Mixtures of two or more of these hydrocarbons may also be used.

The polymerization process may be conducted under continuous, batch or semi-batch conditions.

The block copolymer of the present invention also has an extender such as an extender oil or a low molecular weight compound added to the prepared block copolymer by mixing either during the cement state of the block copolymer or during processing. Suitable extender oils include those well known in the art such as naphthenic, aromatic and paraffinic petroleum oils and silicone oils. Examples of low molecular weight compounds or components useful as extenders in the compositions of the present invention are low molecular weight organic materials having a number-average molecular weight of less than 20,000, preferable less than 10,000, and most preferably less than 5,000. Although there is no particular limitation to the material which may be employed, the following is a list of examples of appropriate materials:

(1) Softening agents, namely aromatic naphthenic and paraffinic softening agents for rubbers or resins;

(2) Plasticizers, namely plasticizers composed of esters including phthalic, mixed phthalic, aliphatic dibasic acid, glycol, fatty acid, phosphoric and stearic esters, epoxy plasticizers, other plasticizers for plastics, and phthalate, adipate, sebacate, phosphate, polyether and polyester plasticizers for NBR;

(3) Tackifiers, namely coumarone resins, coumarone-indene resins, terpene phenol resins, petroleum hydrocarbons and rosin derivative;

(4) Oligomers, namely crown ether, flourine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins;

(5) Lubricants, namely hydrocarbon lubricants such as paraffin and wax, fatty acid lubricants such as higher fatty acid and hydroxy-fatty acid, fatty acid amide lubricants such as fatty acid amide and alkylene-bis-fatty acid amide, ester lubricants such as fatty acid-lower alcohol ester, fatty acid-polyhydric alcohol ester and fatty acid-polyglycol ester, alcoholic lubricants such as fatty alcohol, polyhydric alcohol, polyglycol and polyglycerol, metallic soaps, and mixed lubricants; and (6) Petroleum hydrocarbons, namely synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

Other appropriate low-molecular organic materials include latexes, emulsions, liquid crystals, bituminous compositions and phosphazenes. One or more of these materials may be used as extenders.

In accordance with the present invention, the block copolymer composition of the present invention has added thereto at least about 30 to about 1000 parts by weight of an extender per 100 parts by weight of the block copolymer. Preferred amounts of added extender include from about 50 to about 500 parts of extender per 100 parts of block copolymer and ideally about 80 to about 400 parts of extender per 100 parts of block copolymer.

It is frequently desirable to include other additives well known in the rubber art to the compositions of the present application in amounts of 1 to 350 parts of inorganic filler or other additive per 100 parts of block copolymer. Stabilizers, antioxidants, conventional fillers, reinforcing agents, reinforcing resins, compatibilizing resins, pigments, fragrances and the like are examples of some such additives. Specific examples of useful antioxidants and stabilizers include 2-(2'-hydroxy-5'-methylphenyl) benzotriazole, nickel dibutyldithiocarbamate, zinc dibutyl dithiocarbamate, tris (nonylphenyl)-phosphite, 2,6-di-t-butyl-4-methylphenol and the like. Exemplary conventional fillers and pigments include silica, carbon black, titanium dioxide, iron oxide and the like. These compounding ingredients are incorporated in suitable amounts depending upon the contemplated use of the product.

A reinforcing agent may be defined as the material that is added to a resinous matrix to improve the strength of the polymer. Most of these reinforcing materials are inorganic or organic products of high molecular weight or fibers. Various examples include glass fibers, asbestos, boron fibers, carbon and graphite fibers, whiskers, quartz and silica fibers, ceramic fibers, metal fibers, natural organic fibers, and synthetic organic fibers. Elastomers and resins are also useful to enhance specific properties like elasticity, mechanical strength, damping properties, adhesion and processability. Butyl rubber, amorphous polystyrene, polypropylene, polyethylene, natural rubber, styrene-butadiene-styrene block copolymer (SBS), hydrogenated styrene-butadiene-styrene block copolymer (SEBS), styrene-isoprene-styrene block copolymer (SIS), ethylene/propyrene rubber (EPR), and ethylene/propylene/diene rubber (EPDM), butadiene/acrylonitrile elastomer, adhesives like Reostomer (produced by Riken-Vinyl Inc.), hydrogenated styrene-isoprene-styrene block copolymers such as Hybler (produced by Kurare Inc.), polynorbornenes such as Norsorex (produced by Nippon Zeon Inc.), and other thermoplastic elastomers and resins could be used. These reinforcing agents are useful in amounts of 1 to up to 1500 parts, preferably 10 to 1000 parts, per 100 parts of block copolymer.

The block polymers of the instant invention can be used in high temperature applications including uses in injection molding or in any other compositions typically containing used for elastomeric properties.

In summary, the syndiotactic polystyrene-elastomeric block copolymer composition according to the present invention retains elastomeric characteristics and is useful in high temperature applications. The polymer gels produced according to the present invention generally have a Shore A hardness ranging from about 0 to about 50, preferably about 1 to 50, most preferably about 10 to 30 at about 20° C. to 25° C. or at room temperature.

The compositions of the present invention are favorably used in the manufacturing of any product in which the following properties are advantageous: a high degree of softness, heat resistance, decent mechanical properties, and elasticity. The compositions of the present invention can be used in all industry fields, in particular, in the fabrication of household electrical appliances, industrial machinery, precision instruments, transport machinery, constructions, engineering, and medical instruments.

Representative examples the use of damping materials, vibration restraining materials, cushion gel are connecting materials such as sealing materials, packing, gaskets and grommets, supporting materials such as mounts, holders and insulators, and cushion materials such as stoppers, cushions, and bumpers. These materials are also used in equipment producing vibration or noise and household electrical appliances, such as air-conditioners, laundry machines, refrigerators, electric fans, vacuums, driers, printers and ventilator fans. Further, these materials are also suitable for impact absorbing materials in audio equipment, electronic or electrical equipment, sporting goods and shoes. Further, as super low hardness rubbers, these materials are applicable for use in appliances, damping rubbers, and as low hardness plastics, and they are preferable for use in molding materials. Further, because the present compositions can be used to control the release of internal low molecular weight materials out from the compositions, they are useful as a release support to emit materials such as fragrance materials, medical materials and other functional materials. The compositions of the present invention also possess utility in applications of use in liquid crystals, adhesive materials and coating materials.

Specific examples of uses of the compositions of the present invention are as follows:

(1) in audio equipment, such as in insulators for a portable CD or a CD mounted on a vehicle, mike holders for home video cassette recorder, radio cassette recorder, karaoke or handy mike, etc., an edge cone of a speaker, a tape holder of a radio cassette, a holder of a portable mini-disk player, an optical disk holder of a digital video disk, etc.;

(2) in information relating equipment, such as in insulators for a hard disk, insulators for motors such as a spindle motor for HHD and stepping motor, insulators for floppy disk drive, insulators for CD-ROM of personal computer, and a holder for optical disk;

(3) in communication equipment, such as in a holder for compact high performance mike or speaker of a portable telephone, a pocket bell or PHS, a mike holder for a wireless equipment, and a disk holder for portable note type electronic equipment;

(4) in home electronics equipment, such as in insulators for CD-ROM of home TV game, insulators for cassette holder or CD-ROM of cassette holder or game machine, a holder of high performance mike, and cone edge of speaker; and (5) in other applications, such as in damping materials for printer head of a wordprocessor, printer of personal computer, small or middle handy type printer, or name printers, and insulators for CD-ROM used for measure equipment.

In the following, the present invention will be described in more detail with reference to non-limitative examples. The following examples are presented for purposes of illustration only and are not to be construed in a limiting sense. All percentages are by weight unless otherwise specified.

EXAMPLE 1

Synthesis of BR-sPS (1) Preparation of Living BR Cement

To a one-gallon reactor was charged 2.110 lbs (956.9 grams) of butadiene/hexane blend (containing 23.7% in weight of butadiene), 1311.0 grams of hexane, and 2.27 mmol of n-butylithium (1.60 molar in hexane) diluted with 70 grams of hexane was charged to the reactor. Polymerization was then conducted at 45° C. for 6 hours. The conversion of monomer to polymer was essentially 100%. A small sample of the living polymer cement was removed from the reactor and coagulated with isopropanol. The analytical results of the resulting polybutadiene are: $M_n$=90,723, $M_w$=97,154; $M_n/M_w$=1.07 (GPC); % 1,4 content=92.6%; % Vinyl content=7.4% (NMR); and Tg=−95.2° C. (DSC).

(2) Preparation of Diblock Copolymer BR-sPS

An oven dried 32 oz. glass bottle was capped with a self-sealing rubber liner and a perforated metal cap and cooled under a stream of nitrogen. A charge of 100.6 g of the living polymer cement prepared in Example 1(1) was transferred from the reactor into the 32 oz. bottle. The block polymerization of styrene onto the polybutadiene base polymer was conducted by sequentially adding 0.086 mmol of cyclopentadienyltitanium trichlolide ($CpTiCl_3$), 121.9 g of styrene/hexane blend (containing 33.3% by weight of styrene), and 60.0 mmol of methylaluminoxane (MAO) into the bottle. The resulting mixture was shaken at room temperature for 17 hours and then poured into an excess of isopropanol, and dried in a vacuum oven to yield 17.1 g of BR-sPS block copolymer. As measured by differential scanning calorimetry (DSC), the glass transition temperature ($T_g$) was −92.6° C., the melting temperature ($T_m$) was 249.5° C., and the weight percentage of sPS in the block copolymer was 35%. The experimental data are summarized in Table I.

EXAMPLES 2 to 4

The procedure in Example 1(2) was repeated except that the amounts of living polymer cement as obtained in Example 1(1), $CpTiCl_3$, styrene/hexane blend, and MAO were altered as shown in Table 1. The experimental data are summarized in Table I.

EXAMPLES 5 and 6

The procedure in Example 1(2) was repeated except that the amounts of living polymer cement as obtained in Example 1(1), $CpTiCl_3$, styrene/hexane blend, and MAO were altered as shown in Table 1 and after the addition of $CpTiCl_3$ to the living BR cement, MAO was added followed by the styrene/hexane blend. The experimental data are summarized in Table I.

TABLE I

| Example No. | 1 | 2 | 3 | 4 | 5 | 6 |
|---|---|---|---|---|---|---|
| BR Cement (g) | 100.6 | 195.6 | 215.7 | 329.6 | 201.4 | 291.8 |
| $CpTiCl_3$ (mM) | 0.086 | 0.166 | 0.183 | 0.280 | 0.172 | 0.240 |
| 33.3% Styrene (g) | 121.9 | 89.1 | 65.4 | 66.7 | 106.7 | 60.8 |
| MAO (mM) | 60.0 | 116 | 128 | 196 | 120 | 168 |
| Polymer yield (g) | 17.1 | 29.8 | 29.9 | 38.6 | 31.0 | 29.9 |
| $T_g$ (° C.) | −92.6 | −92.6 | −92.7 | −92.8 | −92.7 | −92.8 |
| $T_m$ (° C.) | 249.5 | 250.2 | 249.1 | 248.0 | 254.1 | 251.4 |
| % sPS* | 35% | 22% | 18% | 14% | 35% | 16% |

*The weight percentage of syndiotactic polystyrene in the diblock is calculated as the ratio of the Δ $h_m$ values for BR-sPS prepared as in the table and sPS prepared with $CpTiCl_3$/MAO.

EXAMPLE 7

(1) Preparation of Living Tapered SBR Cement

To a one-gallon reactor was charged 1.515 lbs (687.3 grams) of styrene/hexane blend (containing 33 wt. % styrene in hexane), 2.110 lbs (956.9 grams) of butadiene/hexane blend (containing 23.7 wt. % 1,3-butadiene in hexane), 623.8 grams of hexane and 2.27 mmol of n-butyllithium (1.60 molar in hexane). Copolymerization of 1,3-butadiene and styrene was then conducted at 50° C. for 3.5 hours. Monomer conversion to polymer was 51% at this point in the process. The resulting living polymer cement contained a substantial amount of unreacted styrene. A small portion of the polymer cement was removed from the reactor and coagulated with isopropanol for analysis. The analytical results of the SBR copolymer are: $M_n$=132,332, $M_w$=139,443; $M_n/M_w$=1.0537(GPC); styrene content=13.0%; block styrene content=0%; % 1,4 BD content=92.6%; % Vinyl BD content=7.4% (NMR analysis); and Tg=−81.6° C.

(2) Preparation of Diblock Copolymer SBR-sPS

An oven dried 32 oz. glass bottle was capped with a self-sealing rubber liner and a perforated metal cap and cooled under a stream of nitrogen. A charge of 275.0 g of the living polymer cement prepared in Example 7(1) was transferred from the reactor into the 32 oz. bottle. The block polymerization of styrene onto the SBR base polymer was conducted by sequentially adding 0.234 mmol of $CpTiCl_3$ and 164 mmol of MAO into the bottle. The resulting mixture was shaken at room temperature for 10 hours and then poured into an excess of isopropanol containing an antioxidant. The polymer product was filtered off, washed with isopropanol and dried in a vacuum oven to yield 36.0 g of SBR-sPS block copolymer. The experimental data are summarized in Table II.

EXAMPLE 8

The procedure in Example 7(2) was repeated except that the polymerization time and the amounts of living polymer cement as obtained in Example 7(1), $CpTiCl_3$, and MAO were altered as shown in Table II. The experimental data are summarized in Table II.

Based upon analytical data, anionic polymerization theory and the inventors' previous experiences, the polystyrene-butadiene block portion of the copolymer displayed a bellowed tapered structure having an increasing styrene content along the chain during formation. The gradient shift along the chain backbone from a low styrene elastomeric SBR cement to a SBR having an increasing styrene content and then to a rigid sPS produces a copolymer having an organized morphology, better miscibility to oil and to other polymers, and as a result, better mechanical strength and/or other physical properties Since no additional styrene monomer was charged when or after the Ti catalyst was introduced, unnecessary catalyst deactivation which could be caused by impurities present in any additionally charged styrene monomer was avoided. In an actual industrial production scale, the absence of such impurities would contribute to the production of a more stable product polymer quality.

TABLE II

| Example No. | 7 | 8 |
|---|---|---|
| SBR cement (g) | 275.0 | 277.9 |
| $CpTiCl_3$ (mM) | 0.234 | 0.236 |
| MAO (mM) | 164 | 165 |
| Polymer yield (g) | 36.0 | 38.1 |
| $T_g$ (° C.) | −79.5 | −80.6 |
| $T_m$ (° C.) | 250.5 | 252.4 |
| React. Time (hr)* | 10 | 19 |
| % sPS* | 14% | 21% |

*The weight percentage of syndiotactic polystyrene in the diblock is calculated as the ratio of the $\Delta h_m$ values for BR-sPS prepared as in the table and sPS prepared with $CpTiCl_3$/MAO.

EXAMPLE 9
(1) Preparation of Semi-Batch Living SBR Cement

A 5 gallon reactor was charged with 3679 g of hexane and 24.98 mmol of n-butyllithium. The mixture inside the reactor was maintained at 83° C., while a mixture of 912 g of a 33% by weight solution of styrene in hexane, and 5071 g of a 31.4% solution of butadiene in hexane was slowly added to the reactor via a computer-controlled metering system at a flow rate of 66.5 g/min. Thirty minutes after the completion of the addition, 318 g of butadiene/hexane blend (containing 31.4% by weight of butadiene) was added to the reactor. This addition was performed in order to turn all living ends into "butadienyl Li" ends. The resultant mixture was maintained in the reactor at 83° C. for 30 minutes.

A small portion of the living polymer cement was removed from the reactor and coagulated with isopropanol. The analytical results of the SBR copolymer are: $M_n$=91,301; $M_w$=102,101; $M_n/M_w$=1.11 (GPC); styrene content= 16.3%; block styrene content=3.7%; % 1,4 BD content= 90.7%; % Vinyl BD content=9.7% (NMR analysis); and Tg=−79.6° C.

(2) Preparation of Diblock Copolymer SBR-sPS

A charge of 254.6 g of the living polymer cement prepared in Example 9(1) was transferred from the reactor into a 32 oz. glass bottle followed by the sequential addition of 0.509 mmol of $CpTiCl_3$, 97.6 g of a 33% by weight solution of styrene in hexane and 356 mmol of MAO. The resulting mixture was agitated at room temperature for 40 minutes and then poured into an excess of isopropanol containing an antioxidant. The polymer product was filtered off, washed with isopropanol and dried in a vacuum oven to yield 64.9 g of SBR-sPS block copolymer. The experimental data are summarized in Table III.

TABLE III

| Example No. | 9 | 10 |
|---|---|---|
| SBR cement (g) | 254.6 | 255.4 |
| $CpTiCl_3$ (mM) | 0.509 | 0.509 |
| MAO (mM) | 356 | 356 |
| Polymerization Time (min) | 50 | 95 |
| Polymer yield (g) | 64.9 | 68.6 |
| $T_g$ (° C.) | −77.8 | −76.8 |
| $T_m$ (° C.) | 254.4 | 255.8 |
| % sPS | 29% | 32% |

EXAMPLE 10

The procedure in Example 9(2) was repeated except that the polymerization time and the amounts of living polymer cement as obtained in Example 9(1), $CpTiCl_3$, styrene/hexane blend and MAO were altered as shown in Table III. The results are shown in Table III.

EXAMPLE 11
(1) Preparation of Semi-Batch Living SBR Cement

A 5 gallon reactor was charged with 4536 g of hexane and 14.19 mmol of n-butyllithium. The mixture inside the reactor was maintained at 83° C., while a mixture of 517 g of a 33% by weight solution of styrene in hexane, 2880 g of a 31.4% solution of butadiene in hexane, and 3225 g of hexane was slowly added to the reactor via a computer-controlled metering system at a flow rate of 73.6 g/min. Thirty minutes after the completion of the addition, 181 g of butadiene/hexane blend (containing 31.4% by weight of butadiene) was added to the reactor. The resultant mixture was maintained in the reactor at 83° C. for 30 minutes.

A small portion of the living polymer cement was removed from the reactor and coagulated with isopropanol. The analytical results of the SBR copolymer are: $M_n$=85, 533; $M_w$=93,020; $M_n/M_w$=1.09(GPC); styrene content= 18.1%; block styrene content=8.9%; % 1,4 BD content= 90.4%; % Vinyl BD content=9.6% (NMR analysis); and Tg=−81.2° C.

(2) Preparation of Diblock Copolymer SBR-sPS

A charge of 8160 g of the living polymer cement prepared in Example 11(1) was added into a five gallon reactor followed by the sequential addition of 8.16 mmol of $CpTiCl_3$, 1646 g of a 33% by weight solution of styrene in hexane and 5712 mmol of MAO. The resulting mixture was agitated at 25° C. for 55 minutes after the addition of the MAO, and 5715 g of the reaction mixture was removed from the reactor and then poured into an excess of isopropanol containing an antioxidant. The polymer product was filtered off, washed with isopropanol and dried in a vacuum oven to yield 452.6 g of SBR-sPS block copolymer. As measured by differential scanning calorimetry (DSC), the glass transition temperature ($T_g$) of the polymer was −80.7° C., the melting temperature ($T_m$) was 244.9° C., and the weight percentage of sPS in the block copolymer was 11%.

EXAMPLE 12

In Example 11(2), 85 minutes after the addition of MAO, 5416 g of the reaction mixture was removed from the reactor and dropped into an excess of isopropanol containing antioxidant. The polymer product was filtered off, washed with isopropanol, dried in a vacuum oven to yield 428.9 g of polymer. As measured by DSC, the glass transition temperature ($T_g$) was −79.8° C., the melting temperature ($T_m$) was 247.2° C., and the weight percentage of sPS in the block copolymer was 13%.

EXAMPLE 13

(1) Preparation of KTA Modified Living SBR Cement

A one-gallon reactor was charged with 171.8 g of a 33% by weight solution of styrene in hexane, 528.4 g of a 32.2% solution of butadiene in hexane, 1467.8 g of hexane, 2.83 mmol of n-butyllithium, and 0.010 mmol of potassium t-amylate (KTA) diluted with 50 ml of hexane. Copolymerization of styrene and butadiene was then conducted at 50° C. for 5.5 hours. Then 47 g of butadiene/hexane blend (containing 23.9% by weight of butadiene) was added, and the mixture was heated at 50° C. for 30 minutes to the reactor.

A small portion of the living polymer cement was removed from the reactor and coagulated with isopropanol. The analytical results of the resulting SBR copolymer is as follows: $M_n$=78,564; $M_w$=84,607; $M_n/M_w$=1.08(GPC); styrene content=23.3%; block styrene content=14.2%; %-1,4 BD content=87.2%; % Vinyl BD content=12.4% (NMR analysis); and $T_g$=−72.1° C.

(2) Preparation of Diblock Copolymer SBR-sPS

A charge of 319.4 g of the living polymer cement prepared in Example 13(1) was added into a 32 oz. bottle followed by the sequential addition of 0.339 mmol of $CpTiCl_3$, 60.0 g of a 33% by weight solution of styrene in hexane and 237 mmol of MAO. The resulting mixture was shaken at room temperature for 5 hours and then poured into an excess of isopropanol containing an antioxidant. The polymer product was filtered off, washed with isopropanol and dried in a vacuum oven to yield 36.3 g of KTA modified SBR-sPS block copolymer. As measured by DSC, the glass transition temperature ($T_g$) of the polymer was −71.0° C., the melting temperature ($T_m$) was 249.2° C., and the weight percentage of sPS in the block copolymer was 20%,

EXAMPLES 14 to 26

Oil-Extended Block Copolymers

A charge of 24.5 grams of each polymer produced in Examples 1 to 13 and 0.5 grams of an anti-oxidant was introduced into separate Brabender mixers (65 grams capacity) equipped with a roller blade. Each polymer charge was ground at 60 rpm in the Brabender at room temperature for 15 minutes and then 24.5 grams of oil was slowly charged to each polymer for 10 minutes. After addition of the oil was completed, each of the Brabender mixers was heated at 110° C. with 120 rpm for 25 minutes, followed by additional mixing at 20 rpm for 10 minutes. The resulting oil extended polymers were dough-like material and were very stable at room temperature for several months prior to molding.

After the oil-extended polymers were molded at 290° C. in a press over temperature for ~10 min., the mold was then cooled at a rate of 2° C. per minute to prevent delta-phase formation. The physical properties of the oil-extended polymers is shown in Tables IV and V. The physical properties of comparative control polymers 1, 2 and 3 formed from oil extended sPS, polybutadiene and SBR, respectively and formed in accordance with the procedures of Examples 14 to 26 are also displayed in Tables IV and V.

TABLE IV

| Example No. | Control 1 | Control 2 | Ex. 14 | Ex. 15 | Ex. 16 | Ex. 17 | Ex. 18 | Ex. 19 |
|---|---|---|---|---|---|---|---|---|
| Block Polymer Used (Formed In) | | | Ex. 1 | Ex. 2 | Ex. 3 | Ex. 4 | Ex. 5 | Ex. 6 |
| Polymer Type | sPS | Polybutadiene | Low Vinyl BR-sPS | Low Vinyl BR-sPS | Low Vinyl BR-sPS | Low Vinyl BR-sPS | Low Vinyl BR-sPS | Low Vinyl BR-sPS |
| sPS weight % | 100 | 0 | 35 | 22 | 18 | 14 | 35 | 16 |
| Tm (° C.) of sPS Block (DSC) | 255.7 | — | 249.5 | 250.2 | 249.1 | 248.0 | 254.1 | 251.4 |
| Processability in mixing/molding* | N.P.** | Poor | Good | Good | Good | Good | Good | Good |
| Oil content (%) | 80 | 50 | 50 | 50 | 50 | 50 | 50 | 50 |
| <Physical Properties> | | | | | | | | |
| Shore A Hardness (25° C.) | 71 | 11 | 50 | 30 | 20 | 16 | 29 | 20 |
| Compression Set at 100° C. (%)*** | — | 28 | 71 | 39 | 48 | 51 | 37 | 32 |
| Compression Set at 150° C. (%)*** | — | 41 | 80 | 41 | 58 | 60 | 66 | 46 |
| Ring Tensile (psi) | — | 28 | — | 98 | 92 | 71 | 158 | 151 |
| Tensile Strength Elongation (%) | — | 233 | — | 372 | 669 | 575 | 284 | 332 |

*Processability in mixing was determined to be good if (1) the miscibility between the extender and the polymer exhibited single phase consistency and (2) the mixtures displayed a lack of trapped gasses or bubbles. Processability in molding was determined to be good if the molded surface of the product was uniformly smooth, soft and scorch-free.
**Not processable
***Compression Set was measured based on conditions of ASTM D395-89, except that the sample size an displacement were changed as follows: Sample height - 15 mm; Sample diameter - 8 mm; Displacement - Sample is compressed to 10 mm and stored in an oven @ 100° C. (or @ 150° C.) for 22 hours. The sample is removed from the oven, the stress on the sample is relieved, the sample is stored at room temperature for 30 minutes and the recovery of the sample is measured
as the final sample height as X in: Compression Set = ((15 − X)/(15 − 10)) × 100%.

In Control 1 as seen in Table IV, the oil extended sPS homopolymer was plastic-like, lacked elasticity and had little elongation. Also, as for the homopolybutadiene polymer, processability with oil was poor, however samples were made and properties were measured. Although this composition displays a low Shore A Hardness and a good Compression Set, the tensile strength is too low to be practically used.

TABLE V

| Example No. | 20 | 21 | 22 | 23 | 24 | 25 | 26 | Control 3 |
|---|---|---|---|---|---|---|---|---|
| Block Polymer Used (Formed In Ex.) | Ex. 7 | Ex. 8 | Ex. 9 | Ex. 10 | Ex. 11 | Ex. 12 | Ex. 13 | — |
| Polymer Type | Tapered SBR-sPS | Tapered SBR-sPS | Metered SBR-sPS | Metered SBR-sPS | Metered SBR-sPS | Metered SBR-sPS | KTA SBR-sPS | SBR |
| sPS weight % | 14 | 21 | 29 | 32 | 11 | 13 | 20 | — |
| Tm(° C.) of sPS Block (DSC) | 250.5 | 252.4 | 254.4 | 255.8 | 244.9 | 247.2 | 249.2 | — |
| Processability in mixing and molding | Good | Good | Poor | Poor | Good | Poor | Good | Good |
| Oil content (%) | 50 | 50 | 50 | 50 | 50 | 50 | 50 | 50 |
| % Vinyl of SBR | 7.4 | 7.4 | 9.7 | 9.7 | 9.6 | 9.6 | 12.4 | 18 |
| <Physical Properties> | | | | | | | | |
| Shore A Hardness (25° C.) | 8 | 12 | 14 | 13 | 10 | 9 | 10 | 3 |
| Compression Set at 100° C. (%) | 60 | 48 | 24 | 34 | 49 | 63 | 35 | 25 |
| Compression Set at 150° C. (%) | 67 | 61 | 37 | 50 | 49 | 76 | 41 | 46 |
| Ring Tensile (psi) | 119 | 162 | 126 | 169 | 77 | 130 | 147 | 20.1 |
| Tensile Strength Elongation (%) | 880 | 770 | 708 | 872 | 965 | 1150 | 680 | 568.9 |

We claim:

1. An unvulcanized, pressure and heat moldable composition comprising: an extended block copolymer composition having an elastomeric block and a syndiotactic poly (vinyl aromatic hydrocarbon) which comprises 100 parts by weight of a block copolymer comprising 1 to 80% by weight of the syndiotactic poly(vinyl aromatic hydrocarbon) block and 99 to 20% by weight of the rubbery elastomeric block and at least about 30 parts by weight of an extender comprising an extender oil or an organic material having a number-average molecular weight of less than 20,000 per 100 parts by weight of said block copolymer.

2. The composition in accordance with claim 1 wherein the elastomeiic block is a conjugated diene/vinyl aromatic block.

3. The composition in accordance with claim 1 wherein the elastomeric block is a diene based elastomer.

4. The composition in accordance with claim 1 wherein the extended block copolymer composition has Shore A hardness ranging from about 0 to about 50 at about 20° C. to 25° C.

5. The composition in accordance with claim 1 wherein the block copolymer comprises 10 to 50% by weight of syndiotactic polystyrene (sPS) block(s) and 90 to 50% by weight of rubbery elastomeric block(s).

6. The composition in accordance with claim 1 wherein the extended block copolymer composition is an oil-extended butadiene/styrene-syndiotactic polystyrene block copolymer.

7. The composition in accordance with claim 1 wherein the extender is present in an amount between about 30 to about 1000 parts by weight per 100 parts by weight of the block copolymer.

8. The composition in accordance with claim 1 wherein said syndiotactic poly(vinyl aromatic hydrocarbon) consists essentially of syndiotactic polystyrene derived from polymerizing a styrenic monomer selected from the group consisting of styrene, alpha-methylstyrene, p-methylstyrene, and mixtures thereof.

9. The composition in accordance with claim 1 wherein said rubbery elastomeric block is selected from the group consisting of styrene/butadiene copolymer rubber, styrene/isoprene copolymer rubber and styrene/isoprene/butadiene rubber.

10. The composition in accordance with claim 1 wherein said rubbery elastomeric block is selected from the group consisting of polybutadiene, random styrene/butadiene copolymers, tapered styrene/butadiene copolymers, styrene/butadiene block copolymers, random styrene/isoprene copolymers, tapered styrene/isoprene copolymers, and random styrene/butadiene/isoprene copolymers.

11. The composition in accordance with claim 1 wherein said rubbery elastomeric block has a vinyl content or 3,4-isoprene content of no more than 20% in the diene monomer contributed units.

12. The composition in accordance with claim 11 wherein said rubbery elastomeric block is random styrene/butadiene copolymer.

13. The composition in accordance with claim 11 wherein said rubbery elastomeric block is tapered styrene/butadiene copolymer.

14. The composition in accordance with claim 1 wherein said rubbery elastomeric block is styrene/butadiene block copolymer which is synthesized using a randomizer selected from the group consisting of tetramethylenediamine, oligomeric oxolanyl propanes, 2,2-bis-(4-methyl-1,3-dioxane), potassium-t-amylate, potassium dodecyl benzene sulfonate, tetrahydrofuran and bis-tetrahydrofuryl propane.

15. The composition in accordance with claim 1 wherein the extender is selected from the group consisting of aromatic oil, naphthenic oil, paraffinic oil and silicone oil.

16. The composition in accordance with claim 1 wherein the extender is at least one compound selected from the group consisting of: softening agents, plasticizers, tackifiers, oligomers, lubricants and petroleum hydrocarbons.

17. The composition in accordance with claim 1 further comprising up to 1500 parts per 100 parts of block copolymer selected from the group consisting: of amorphous polystyrene, polypropylene, polyethylene, butyl rubber, natural rubber, styrene/butadiene/styrene block copolymer, hydrogenated styrene/butadiene/styrene block copolymer, styrene/isoprene block/styrene block copolymer, ethylene/propylene rubber, ethylene/propyleneldiene rubber, and butadiene/acrylonitrile elastomer.

18. The composition in accordance with claim 1 further comprising from 1 to 350 parts of an inorganic filler, said parts by weight based on 100 parts by weight of the composition of claim 1.

19. The composition in accordance with claim 18 wherein said inorganic filler comprises glass fibers.

20. The composition in accordance with claim 1 wherein said syndiotactic poly(vinyl aromatic hydrocarbon) comprises a syndiotactic polystyrene having a melting point of at least 150° C.

21. The composition in accordance with claim 1 wherein said syndiotactic poly(vinyl aromatic hydrocarbon) comprises a syndiotactic polystyrene having a melting point of at least 200° C.

22. The composition in accordance with claim 1 wherein the extended block copolymer composition has Shore A hardness ranging from about 10 to about 30 at about 20° C. to 25° C.

23. The composition in accordance with claim 1 wherein said block copolymer comprises 10 to 50% by weight of the syndiotactic poly(vinyl aromatic hydrocarbon) block.

* * * * *